Jan. 31, 1933.                C. O. HULL                1,895,927
            RUBBER INSULATED ELECTRICAL CABLE
                    Filed May 13, 1931
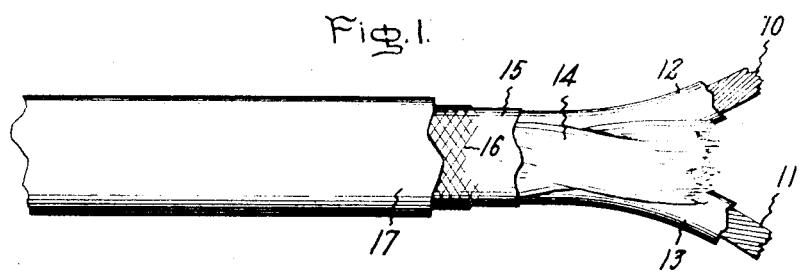
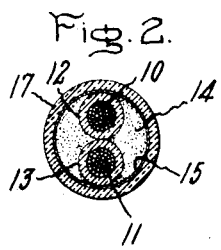
Inventor:
Clifford O. Hull,
by Charles A. Mullar
His Attorney.

Patented Jan. 31, 1933

1,895,927

UNITED STATES PATENT OFFICE

CLIFFORD O. HULL, OF STRATFORD, CONNECTICUT, ASSIGNOR TO GENERAL ELECTRIC COMPANY, A CORPORATION OF NEW YORK

RUBBER INSULATED ELECTRICAL CABLE

Application filed May 13, 1931. Serial No. 537,128.

My invention relates to rubber insulated electrical cables and method of manufacturing such cables. It relates especially to rubber insulated electrical cables comprising two or more rubber covered conductors provided with an outer jacket of rubber.

In the manufacture of such cable difficulty has been experienced in the vulcanizing of the outer jacket. Unless a mold or lead sheath was used over the outer jacket during its vulcanization, blisters would form in the jacket. The use of a mold or lead sheath is undesirable because of the additional expense involved in the provision of the mold or sheath and the additional labor necessary in the placing of the mold or sheath before vulcanization and its removal after vulcanization. There was the additional difficulty in such cable in that the outer jacket adhered to the filler used to make the cable round and this made the removal of the jacket to strip the conductors rather difficult.

One object of my invention is to provide a method of manufacturing rubber insulated electrical cable having individual rubber insulated conductors combined with a filler and an outer jacket of rubber which will not require the use of a mold or lead sheath during the vulcanization of the jacket.

Another object of my invention is to produce such a cable in which the jacket will not adhere to the filler and so the filler and conductors will be loose within the jacket and the jacket may be removed very readily.

I have found that the blistering of the outer jacket during vulcanization was caused by the volatilization of moisture in the core construction. The moisture may be in the filler or in the rubber jacket before its vulcanization. I have also found that the blistering only occurs where the outer rubber jacket is in direct contact with the rubber on the individual conductors. This is due to the fact that the rubber jacket will not adhere to the rubber insulation on the separate conductors which has been previously vulcanized and covered with talc. The jacket would adhere to the filler of jute or other fibrous material which would prevent blistering where the jacket was in contact with the filler because the escaping moisture or vapor could not overcome the force of adherence between the rubber and filler.

In accordance with my invention a separator of paper or other fibrous material completely surrounds the combined conductors and filler. This provides a surface to which the jacket will adhere evenly around the circumference. The force of adherence between the separator and rubber jacket is sufficiently great to completely overcome any tendency of escaping vapor or moisture to force the jacket away from the core. This prevents the formation of blisters and permits the vulcanization of the jacket in direct contact with the vulcanizing medium, thus dispensing with the need of a mold or sheath. In addition the separator serves to prevent any adherence between the filler and jacket. Thus the conductors and filler are left loose in the jacket and may slide within the jacket as the cable is bent or flexed without transmitting any tension to the conductor insulation. There is the added feature of the ease of removal of the jacket when it is desired to strip the conductors.

In the accompanying drawing, Fig. 1 shows in elevation an electric cable constructed in accordance with my invention with part of the insulation broken away, and Fig. 2 shows a cross sectional view of the cable.

In the manufacture of cable according to the invention, conductors 10 and 11 are first separately covered with their rubber insulations 12 and 13. The insulated conductors are then assembled and combined with filler 14. In order to cover the conductors 10 and 11 so that there will not be direct contact between the rubber insulation on the conductors and the rubber jacket 17, a separator 15 is drawn longitudinally or wrapped over the conductors to completely surround the combined conductors and filler. This separator may be paper or some other suitable material with a high coefficient of adhesion with rubber. In order to hold the assembled conductors and filler together and also hold the separator in position, an open cotton braid or wind 16 is applied over the separator 15. The separator 15 and cotton braid 16 may be applied in the same operation, the separator 15 being drawn over the assembled conductors a little in advance of the point of application of the cotton braid 16. The outer jack 17 is then applied and vulcanized in direct contact with the vulcanizing medium which may be steam or any other suitable medium, examples of which are well known in the art. The separator 15 is provided to present a continuous surface around the assembled conductors and filler to which the outer jacket may adhere evenly during the vulcanization of the jacket and to separate the filler and jacket. If the jacket contacts with the rubber insulation on one of the conductors at any point and moisture is volatilized in the core during vulcanization, the escaping vapor will force the outer jacket from the conductor insulation because there is no force of adherence between the two and this will cause a blister to be raised at that point on the jacket. When the separator is provided, the adherence between the separator and the outer jacket is sufficiently great to overcome the tendency of the volatilized moisture to force the jacket away from the core.

By means of my invention it is possible to manufacture rubber insulated cable at lower cost in that I am enabled to dispense with the need of a mold or sheath in the vulcanizing of the rubber jacket. The separator is of low cost and does not add much to the cost of the assembly of the cable because it may be applied in the same operation with the open cotton braid. The cable produced by my process is an improved product in that the conductors and filler are entirely loose within the outer jacket. This is an important feature because in the use of such cable it is frequently flexed and when installed is likely to be bent around sharp corners. The conductors and filler being loose within the jacket will slide longitudinally of the jacket as it is flexed and no tension will be transmitted from the jacket to the conductor insulation. In addition, the complete separation of the conductors, filler, and jacket makes it easy to remove the jacket and strip the conductors when any electrical connection is to be made to the conductors.

What I claim as new and desire to secure by Letters Patent of the United States is:

1. The method of manufacturing rubber covered multi-conductor cable which comprises assembling the conductors and a filler, providing a paper separator thereon, applying a jacket of uncured rubber over said separator, and then vulcanizing the rubber jacket.

2. The method of manufacturing rubber covered multi-conductor cable which comprises assembling the conductors and a filler, providing a paper separator thereon, covering the separator with an open braid of fibrous material, applying a jacket of rubber over said separator and braid, and then vulcanizing the rubber jacket.

3. The method of manufacturing rubber covered multi-conductor cable which consists in assembling the rubber insulated conductors with a filler, drawing a paper separator over the conductors, applying an open cotton braid over the separator to hold the conductors, filler and separator together, applying a rubber jacket over the separator and braid, and vulcanizing the rubber jacket in direct contact with a vulcanizing medium.

4. An electric cable comprising rubber insulated conductors, a jute filler, a paper separator surrounding said conductors and filler, an open cotton braid over said separator, and a rubber jacket vulcanized to the separator and braid.

In witness whereof, I have hereunto set my hand.

CLIFFORD O. HULL.